(12) United States Patent
Chaki et al.

(10) Patent No.: US 11,202,254 B1
(45) Date of Patent: Dec. 14, 2021

(54) METHODS, SYSTEMS, AND DEVICES FOR SIMULATING VOICE AND DATA TRAFFIC IN A MOBILE NETWORK

(71) Applicant: AT&T Intellectual Property I, L.P., Atlanta, GA (US)

(72) Inventors: Tarun Chaki, Morganville, NJ (US); Thusitha Jayawardena, Holmdel, NJ (US); Nicholas Arconati, St. Louis, MO (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 16/944,439

(22) Filed: Jul. 31, 2020

(51) Int. Cl.
| | | |
|---|---|---|
| *H04W 48/18* | (2009.01) | |
| *H04W 12/06* | (2021.01) | |
| *H04W 4/021* | (2018.01) | |
| *H04W 4/50* | (2018.01) | |
| *H04W 88/06* | (2009.01) | |
| *H04W 8/18* | (2009.01) | |

(52) U.S. Cl.
CPC .......... *H04W 48/18* (2013.01); *H04W 4/021* (2013.01); *H04W 4/50* (2018.02); *H04W 8/183* (2013.01); *H04W 12/06* (2013.01); *H04W 88/06* (2013.01)

(58) Field of Classification Search
CPC ....... H04W 4/90; H04W 8/183; H04W 12/00; H04W 12/06; H04W 12/12; H04W 12/121; H04W 12/125; H04W 12/126; H04W 12/128; H04W 12/30; H04W 12/40; H04W 48/00; H04W 48/02; H04W 48/04; H04W 48/06; H04W 4/50; H04W 4/60; H04W 88/06
See application file for complete search history.

(56) References Cited

U.S. PATENT DOCUMENTS

| | | | | |
|---|---|---|---|---|
| 5,961,331 | A * | 10/1999 | Fisch ................... | G09B 19/165 434/219 |
| 6,081,600 | A * | 6/2000 | Blanchard ........... | H04W 12/037 380/255 |
| 6,757,742 | B1 * | 6/2004 | Viswanath ........ | H04L 29/12018 370/389 |
| 2004/0003070 | A1 * | 1/2004 | Fernald ................... | H04L 43/00 709/223 |
| 2004/0062224 | A1 * | 4/2004 | Brownrigg ............ | H04W 40/02 370/338 |

(Continued)

*Primary Examiner* — Jean A Gelin
(74) *Attorney, Agent, or Firm* — Guntin & Gust, PLC; Atanu Das

(57) ABSTRACT

Aspects of the subject disclosure may include, for example, selecting, a group of International Mobile Subscriber Identities (IMSIs), selecting a group of traffic simulator devices, and provisioning each of the group of IMSIs to each of the group of traffic simulator devices. Further embodiments can include providing first instructions to a first portion of the group of traffic simulator devices. The first instructions cause the first portion of the group of traffic simulator devices to generate simulated voice traffic over a first plurality of time periods. Additional embodiments can include providing second instructions to a second portion of the group of traffic simulator devices. The second instructions cause the second portion of the group of traffic simulator devices to generate simulated data traffic over a second plurality of time periods. Other embodiments are disclosed.

20 Claims, 12 Drawing Sheets

(56) References Cited

U.S. PATENT DOCUMENTS

| | | | | |
|---|---|---|---|---|
| 2006/0239271 | A1* | 10/2006 | Khasnabish | H04L 45/586 370/395.21 |
| 2006/0291402 | A1* | 12/2006 | Yun | H04W 74/0816 370/252 |
| 2007/0019618 | A1* | 1/2007 | Shaffer | H04M 3/2236 370/352 |
| 2007/0025325 | A1* | 2/2007 | Kumar | H04L 47/2416 370/350 |
| 2008/0285520 | A1* | 11/2008 | Forte | H04W 36/08 370/331 |
| 2009/0061860 | A1* | 3/2009 | Jiang | H04W 24/06 455/433 |
| 2012/0155292 | A1* | 6/2012 | Zazula | H04L 43/50 370/252 |
| 2014/0090058 | A1* | 3/2014 | Ward | H04L 63/1433 726/23 |
| 2014/0120977 | A1* | 5/2014 | Amis | H04W 4/90 455/521 |
| 2014/0368610 | A1* | 12/2014 | Grangetto | H04N 13/139 348/43 |
| 2015/0127245 | A1* | 5/2015 | Jang | G08G 1/0129 701/117 |
| 2015/0348219 | A1* | 12/2015 | Unser | G06Q 50/26 705/30 |
| 2016/0330784 | A1* | 11/2016 | Liu | H04W 4/00 |
| 2017/0201497 | A1* | 7/2017 | Rhyu | G06F 21/6209 |
| 2017/0324769 | A1* | 11/2017 | Sadeh | H04L 63/1458 |
| 2018/0011955 | A1* | 1/2018 | Gintis | G06F 30/20 |
| 2021/0160279 | A1* | 5/2021 | Watts | H04L 63/1475 |

* cited by examiner

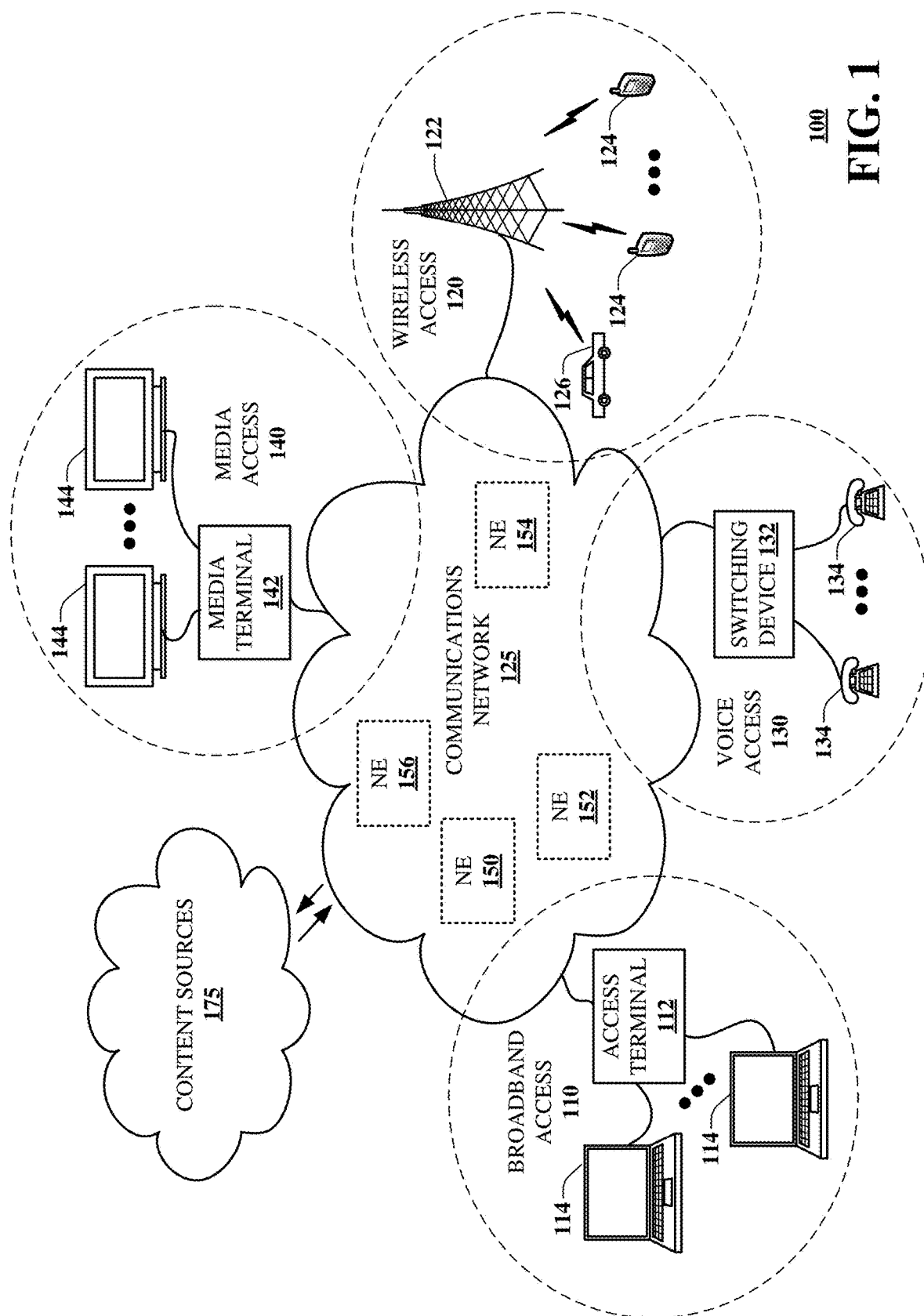

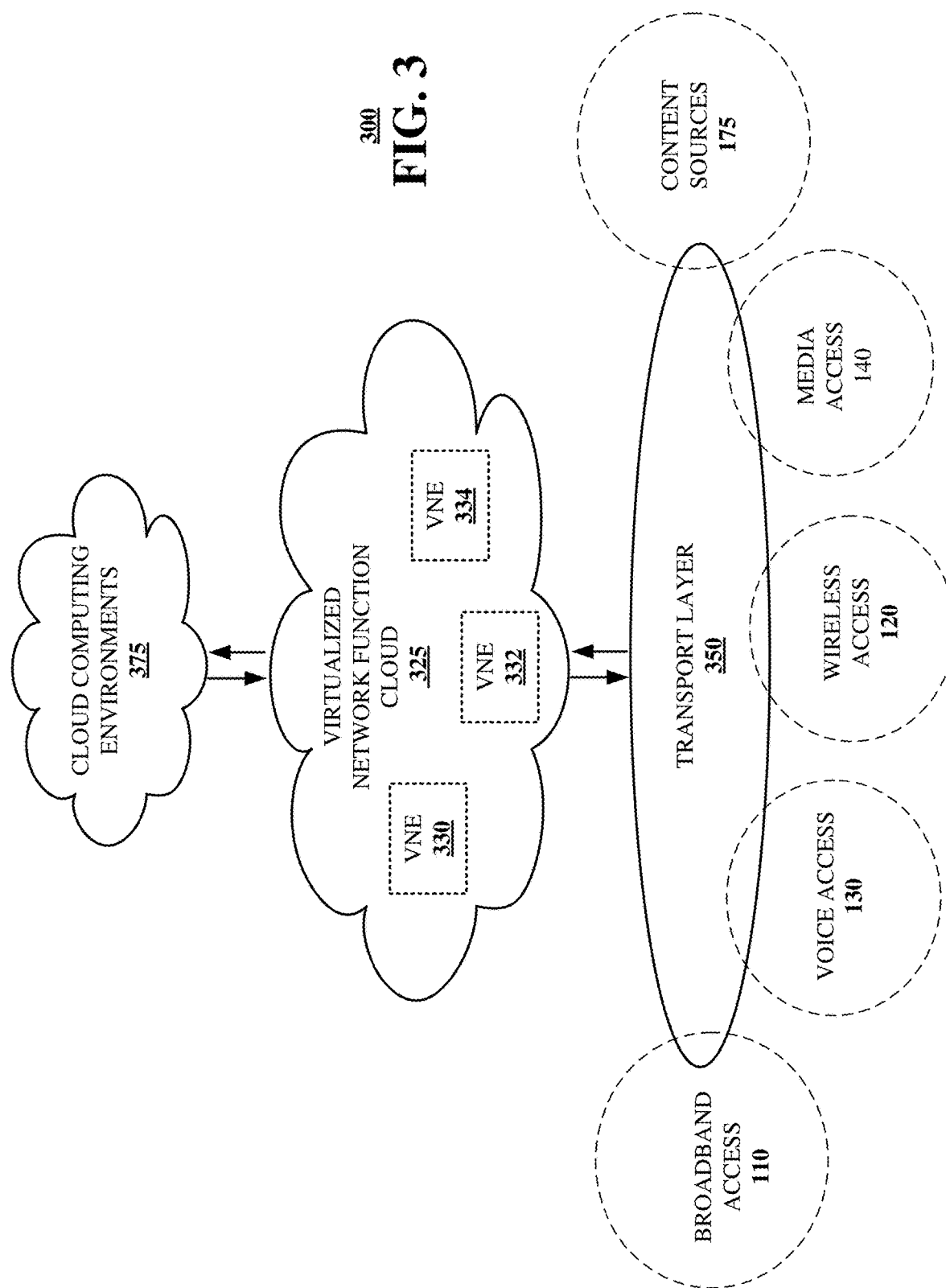

US 11,202,254 B1

METHODS, SYSTEMS, AND DEVICES FOR SIMULATING VOICE AND DATA TRAFFIC IN A MOBILE NETWORK

FIELD OF THE DISCLOSURE

The subject disclosure relates to methods, systems, and devices for simulating voice and data traffic in mobile network.

BACKGROUND

The Radio Access Network (RAN) of a cellular network or mobile network can be vulnerable to eavesdropping using readily available equipment. Further, certain parameters in the mobile network, such as Public Land Mobile Network (PLMN) number, can be transmitted as clear text, such that an eavesdropper can monitor these parameters and any associated activity in the mobile network. For example, and eavesdropper can detect a surge in voice and/or data traffic in a mobile network used by first responders (but not necessarily the content of such voice and/or data traffic). Further, the surge in voice and/or data traffic can be correlated with actual first responder activity, thereby alerting the eavesdropper to impending first responder operations. This can be an inadvertent alerting mechanism with negative side effects in the mobile network dedicated to specific first responder services. This can include the eavesdropper being a criminal subject to law enforcement investigation. The eavesdropper/criminal conducting criminal activity, upon detection of the surge of in voice and/or data traffic on a first responder mobile network can escape the geographic area associated with the surge, thereby evading capture by law enforcement In addition, this alerting mechanism can still be monitored by an eavesdropper even when there is encryption of the data in the mobile network.

BRIEF DESCRIPTION OF THE DRAWINGS

Reference will now be made to the accompanying drawings, which are not necessarily drawn to scale, and wherein:

FIG. 1 is a block diagram illustrating an exemplary, non-limiting embodiment of a communications network in accordance with various aspects described herein.

FIG. 3 is a block diagram illustrating an example, non-limiting embodiment of a virtualized communication network in accordance with various aspects described herein.

DETAILED DESCRIPTION

Figure 2A:
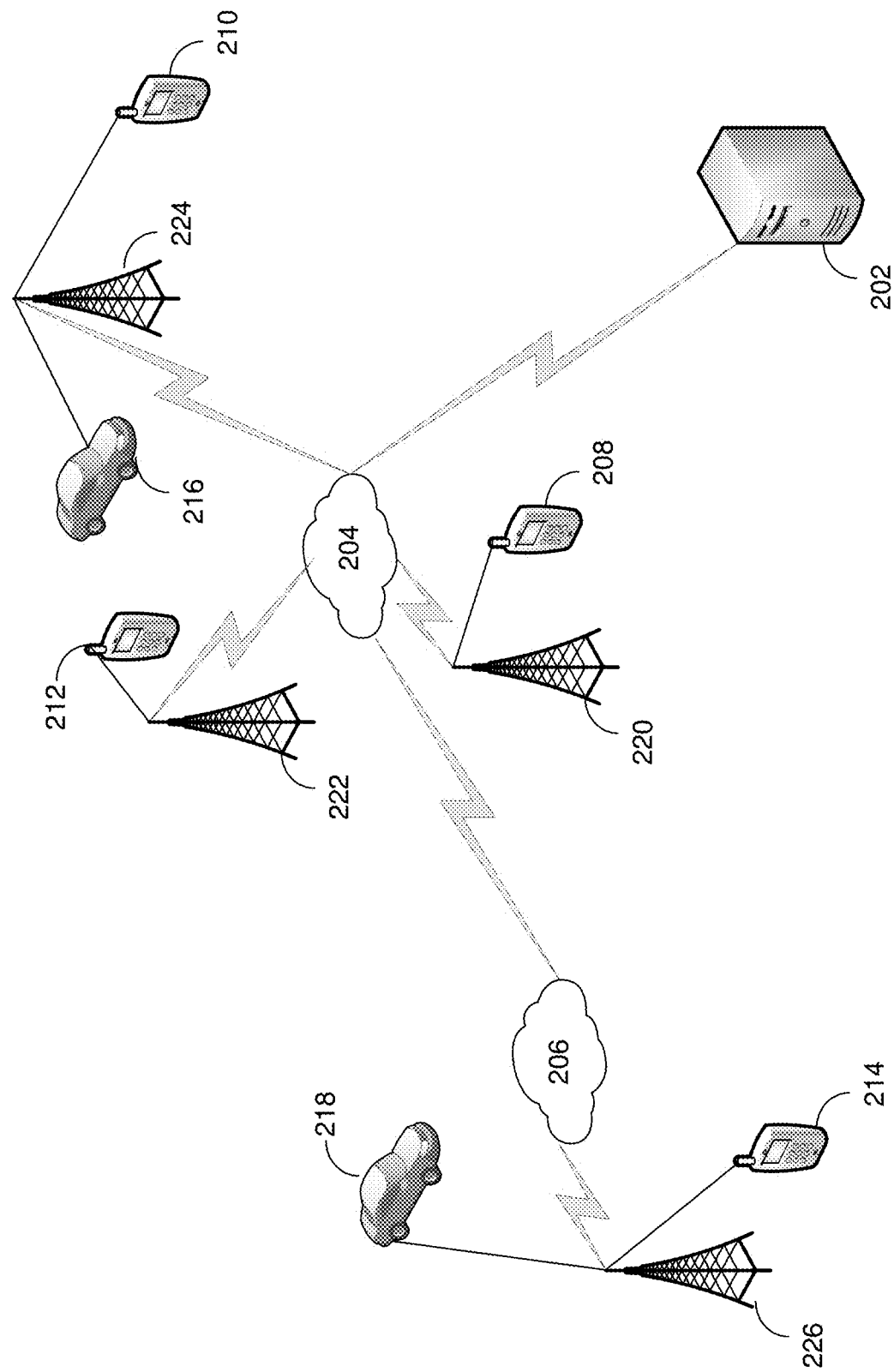
FIGS. 2A-2E are block diagrams illustrating example, non-limiting embodiments of a system functioning within the communication network of FIG. 1 in accordance with various aspects described herein.

The subject disclosure describes, among other things, illustrative embodiments for selecting a first group of International Mobile Subscriber Identities (IMSIs), selecting a group of traffic simulator devices, and provisioning, over a mobile network, each in the first group of IMSIs to each in the group of traffic simulator devices. Further embodiments can include providing, over the mobile network, first instructions to a first portion of the group of traffic simulator devices. The first instructions cause the first portion of the group of traffic simulator devices to generate simulated voice traffic over a first plurality of time periods. Additional embodiments can include providing, over the mobile network, second instructions to a second portion of the group of traffic simulator devices. The second instructions cause the second portion of the group of traffic simulator devices to generate simulated data traffic over a second plurality of time periods. Other embodiments are described in the subject disclosure.

One or more aspects of the subject disclosure include a device, comprising a processing system including a processor, and a memory that stores executable instructions that, when executed by the processing system, facilitate performance of operations. The operations can comprise selecting a first group of International Mobile Subscriber Identities (IMSIs) or a group of Subscriber Permanent IDs (SUPIs) in a 5G network, selecting a group of traffic simulator devices, and provisioning, over a mobile network, each of the first group of IMSIs or SUPIs to each of the group of traffic simulator devices. Further operations can comprise providing, over the mobile network, first instructions to a first portion of the group of traffic simulator devices. The first instructions cause the first portion of the group of traffic simulator devices to generate simulated voice traffic over a first plurality of time periods. Additional operations can comprise providing, over the mobile network, second instructions to a second portion of the group of traffic simulator devices. The second instructions cause the second portion of the group of traffic simulator devices to generate simulated data traffic over a second plurality of time periods. It is to be noted that in the following description, wherever 4G network device IMSIs are mentioned, the description is valid for 5G network device SUPIs.

One or more aspects of the subject disclosure include a machine-readable medium, comprising executable instructions that, when executed by a processing system including a processor, facilitate performance of operations. The operations can comprise selecting a first group of IMSIs, determining an actual traffic baseline for a portion of a mobile network, and identifying a simulated traffic baseline for the portion of the mobile network based on the actual traffic baseline. Further operations can comprise selecting a group of traffic simulator devices according to the simulated traffic baseline, and provisioning, over the mobile network, each of the first group of IMSIs to each of the group of traffic simulator devices. Additional operations can comprise providing, over the mobile network, first instructions to a first portion of the group of traffic simulator devices. The first instructions cause the first portion of the group of traffic simulator devices to generate simulated voice traffic over a first plurality of time periods. Also, the operations can comprise providing, over the mobile network, second instructions to a second portion of the group of traffic simulator devices. The second instructions cause the second portion of the group of traffic simulator devices to generate simulated data traffic over a second plurality of time periods.

One or more aspects of the subject disclosure include a method. The method can comprise selecting, by a processing system including a processor a group of IMSIs, determining, by the processing system, actual traffic for a first portion of a mobile network, and determining, by the processing system, simulated traffic for a second portion of the mobile network to be used as a diversion based on the actual traffic. Further, the method can comprise selecting, by the processing system, a group of traffic simulator devices according to the simulated traffic, and provisioning, by the processing system, over the mobile network, each of the group of IMSIs to each of the group of traffic simulator devices. In addition, the method can comprise providing, by the processing system, over the mobile network, first instructions to a first portion of the group of traffic simulator devices. The first instructions cause the first portion of the group of traffic simulator devices to generate simulated voice traffic over a first plurality of time periods. Also, the method can comprise providing, by the processing system, over the mobile network, second instructions to a second portion of the group of traffic simulator devices. The second instructions cause the second portion of the group of traffic simulator devices to generate simulated data traffic over a second plurality of time periods.

Referring now to FIG. 1, a block diagram is shown illustrating an example, non-limiting embodiment of a system 100 in accordance with various aspects described herein. For example, system 100 can facilitate in whole or in part selecting a group of traffic simulator devices and providing instructions to portions of the group of traffic simulator devices to generate simulated voice traffic and/or simulated data traffic. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

FIGS. 2A-2E are block diagrams illustrating example, non-limiting embodiments of a system functioning within the communication network of FIG. 1 in accordance with various aspects described herein. In one or more embodiments, a mobile network such as a RAN can be vulnerable to eavesdropping by eavesdroppers/criminals (e.g., hackers) using readily available equipment. For a mobile network providing services to consumers, this can pose a security risk. However, for a mobile network providing services to first responders such as law enforcement, fire fighters, and emergency health care workers, such a security risk can be dangerous to first responders. That is, the eavesdroppers can be criminals that are trying to evade law enforcement to commit further crimes posing a danger to first responders as well as local citizens. Further, eavesdroppers can detect a surge of activity on the mobile network such as voice traffic and data traffic that can indicate law enforcement activity (even though the eavesdropper cannot detect the contents of the voice traffic or data traffic). Such activity could indicate that law enforcement are in pursuit of the eavesdroppers such that the eavesdroppers can evade capture from law enforcement. Thus, the detecting of the surge in voice traffic and data traffic in the mobile network can be an alerting mechanism to eavesdroppers/criminals.

The unintending alerting mechanism can arise in different situations. In some embodiments, in rural areas where voice traffic and data traffic in a mobile network are sparse, slight increases in voice traffic and/or data traffic can be detected by eavesdroppers/criminals thereby alerting them to potential law enforcement activity. Further, in some first responder mobile networks, a normal amount of voice traffic and data traffic on the mobile network can be low such that small changes in the amount of voice traffic and data traffic can be detected by eavesdroppers/criminals indicating an increase or decrease in law enforcement activity. In addition, 4G and/or 5G networks that may have low voice traffic and/or data traffic during normal operation such that any increase in voice traffic and/or data traffic can be detected by eavesdroppers/criminals to indicate an increase in law enforcement activity.

In one or more embodiments, to eliminate the security risk of an alerting mechanism to eavesdroppers/criminals on the mobile network, simulated voice traffic and simulated data traffic can be generated. The traffic signatures of the simulated voice traffic and the simulated data traffic can be similar to real traffic signatures during actual operations. The simulated voice traffic and the simulated data traffic can be generated at random times for random durations. The resulting simulated voice traffic and simulated data traffic can be indistinguishable from actual voice traffic and actual data traffic. This disrupts the correlation between voice and/or data traffic surges in the RAN with first responder activity in a local geographic area such that eavesdroppers/criminals may not be able to detect a surge of actual voice traffic and actual data traffic, thereby not alerting the eavesdroppers/criminals of impending law enforcement activity and preventing them from evading capture. In order for the simulated voice traffic and simulated data traffic to be indistinguishable from actual voice traffic and actual data traffic, the simulated voice traffic and the simulated data traffic can have the same characteristics as actual voice traffic and actual data traffic. These characteristics can include transmitting the PLMN and the cell sector number in clear text as well as having the simulated voice traffic and simulated data traffic use the same frequency band as actual voice traffic and actual data traffic. It is to be noted that the simulated voice and/or data traffic disrupts the unintended alerting mechanism efficiently, that is, not by raising the background traffic level continuously to hide the surge of traffic, but by having simulated traffic appear at random times so that an eavesdropper cannot correlate traffic surges with first responder activity.

Referring to FIG. 2A, in one or more embodiments, a mobile network 200 can comprise a server 202 communicatively coupled to a portion 204 of the mobile network. Further, the portion 204 of the mobile network can be communicatively coupled to cellular towers 220, 222, 224. Further, a mobile device 208 can be communicatively coupled to the cell tower 220, a mobile device 212 can be communicatively coupled to the cell tower 222, and law enforcement vehicle 216 and mobile device 210 can be communicatively coupled to the cell tower 224. In addition, a portion 206 of the mobile network can be communicatively coupled to the portion 204 of the mobile network. Also, cell tower 226 can be communicatively coupled to the portion 206 of the mobile network. Further, a mobile device 214 and law enforcement vehicle 218 are communicatively coupled to the cell tower 226. The mobile devices 208, 210, 212, 214 can be a mobile phone, tablet computer, desktop computer, wearable device, or any other computing device that can access the mobile network 200. Mobile devices 208, 210, 212, 214 and law enforcement vehicles 216, 218 can generate actual voice traffic and actual data traffic on the mobile network 200. For example, the mobile network 200 can be a first responder mobile network. Further, user of the mobile devices 208, 210, 212, 214 can be members of law enforcement that can utilize mobile applications or conduct cellular telephone calls over the mobile network 200. A further example can be that law enforcement vehicles 216, 218 can be equipped with computing devices such as laptop computers to access data applications over the mobile network 200 as well as cellular telephones and radios that can carry voice traffic over the mobile network by law enforcement personnel.

Figure 2B:
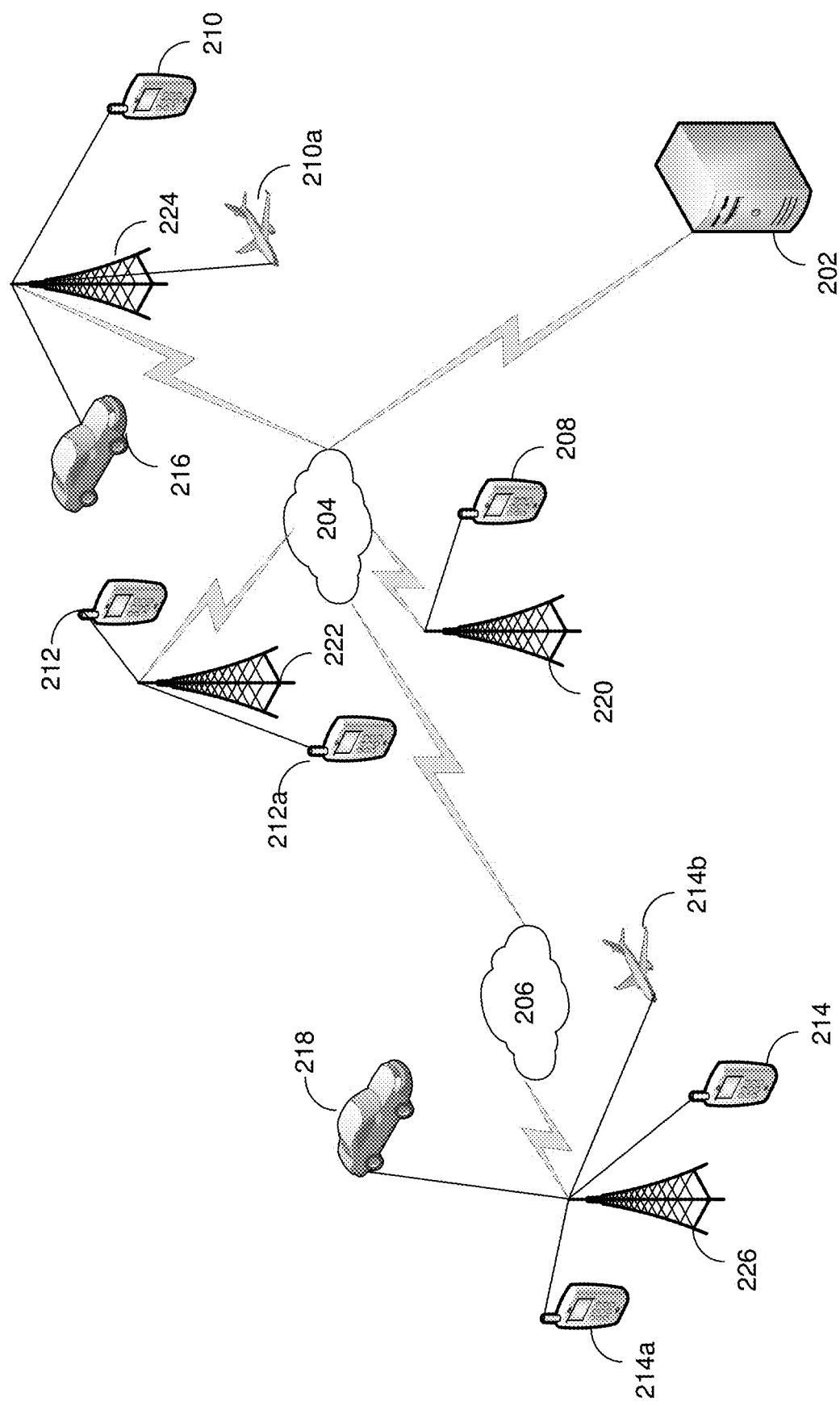

In one or more embodiments, the actual voice traffic and data traffic generated from mobile devices 208, 210, 212, 214 and law enforcement vehicles 216, 218 can be detected by server 202. Further, the server 202 can determine an actual traffic baseline. That is, the server 202 can determine an amount of actual voice traffic and actual data traffic carried on the mobile network (or a portion thereof) generated by the mobile devices 208, 210, 212, 214 and law enforcement vehicles 216, 218 over period of time to determine the average actual voice traffic and actual data traffic. The actual traffic baseline can be the average actual voice traffic and actual data traffic or can be based on (e.g., a multiplier or fraction of) the average actual voice traffic and actual data traffic. In addition, the server 202 can determine that the actual traffic baseline can be below a predetermined threshold. Also, the server can identify a simulated traffic baseline for the mobile network 200 (or portion thereof) that can be above the predetermined threshold. The simulated traffic baseline can be an average simulated voice traffic and simulated data traffic over a period of time carried over the mobile network 200 (or a portion thereof). The simulated voice traffic and the simulated data traffic can be generated by a group of traffic simulator devices. The predetermined threshold and simulated traffic baseline is an amount of simulated voice traffic and/or simulated data traffic such that when there is a surge of actual voice traffic and actual data traffic on the mobile network 200 (and the simulated voice traffic and simulated data traffic is terminated by the server 202 in response to instructions sent to the traffic simulator devices or in response to detecting the surge in actual voice traffic and/or actual data traffic over a threshold accordingly), an eavesdropper/criminal that may be monitoring the mobile network 200 cannot detect a surge in actual voice traffic and actual data traffic, thereby prevented from being alerted of a possible surge in law enforcement activity. Referring to FIG. 2B, in one or more embodiments, the server 202 selects a group of traffic simulator devices 210a, 212a, 214a, 214b, 216a, 218a to generate simulated voice traffic and/or simulated data traffic on the mobile network 200a, 200b (or a portion thereof). In further embodiments, traffic simulator devices can be user devices. However, in additional embodiments traffic simulator devices can be network devices (e.g., cell towers, routers, etc.). In some embodiments, the generated voice traffic and/or simulated data traffic can be generated according to the simulated traffic baseline. Prior to selecting a group of traffic simulator devices 210a, 212a, 214a, 214b, 216a, 218a, the server 202 can select a group of IMSIs (i.e., network credentials or registration information) then provision, over the mobile network 200a, 200b, each of the group of IMSIs to each of the group of traffic simulator devices 210a, 212a, 214a, 214b, 216a, 218a. The group of traffic simulator devices 210a, 212a, 214a, 214b, 216a, 218a can include a drone 210a, a mobile device 212a, 214a, and a drone 214b. Mobile devices 212a and 214a can be mobile phones that have mobile applications that can communicate with server 202 over mobile network 200a. Further, server 202 can provides communications/instructions to the mobile devices 212a and 214a to generate simulated voice traffic and/or generate simulated data traffic to mimic actual voice traffic and/or actual data traffic. Further, drones 210, 214b can be in communication with server 202 over mobile network 200a and be provided instructions to generate simulated data traffic. In some embodiments, server 202 can be a group of servers, a virtual server, or a group of cloud servers. Note, that there is no need to specially conceal the IMSIs used for simulated traffic from an eavesdropper since in 4G networks the IMSI is revealed only during rare situations when a network-assigned temporary UD corresponding to an IMSI is not available. In 5G networks, the IMSI-equivalent, called SUPI (Subscription Permanent Identifier), should be even harder to be tracked by an eavesdropper due to encryption of the SUPI.

Figure 2C:
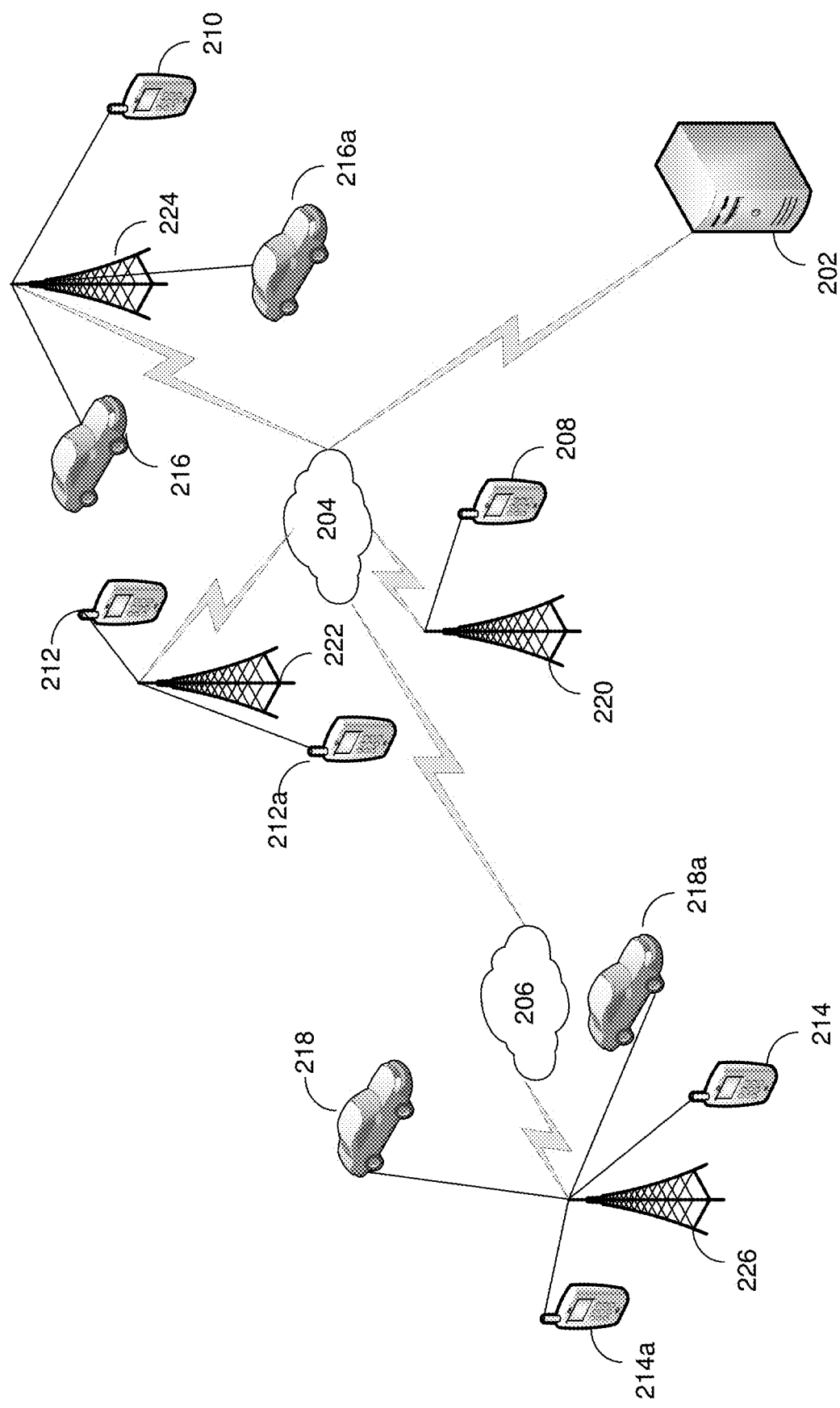

Referring to FIG. 2C, in one or more embodiments, the traffic simulator devices can be part of law enforcement vehicle 216a, 218a (e.g., law enforcement vehicles that are not currently generating actual voice traffic and actual data traffic) or a stationary device that can simulate a stationary device. Each of the traffic simulator devices 210a, 212a, 214a, 214b, 216a, 218a can generate simulated voice traffic and/or simulated data traffic in response to receiving instructions from the server 202 over mobile network 200b or at preconfigured random times. In further embodiments, the server 202 can provide one set of instructions to a portion of the group of traffic simulator devices to generate simulated voice traffic and provide another set of instructions to a portion of the group of traffic simulator devices to generate simulated data traffic. In some embodiments, some traffic simulator devices can generate both simulated voice traffic and simulated data traffic. In additional embodiments, a portion of the traffic simulator devices can generate simulated voice traffic over a plurality of time periods within a 24-hour period (or some other time period) and another portion of the traffic simulator devices can generate simulated data traffic over another plurality of time periods within a 24-hour period (or some other time period). The plurality of time periods can be randomly chosen to further make them indistinguishable from actual voice traffic and/or actual data traffic. In some embodiments the instructions can be provided by server 2020 in separate messages sent to each set of traffic simulator devices. In other embodiments, the server 202 can provide a group of messages, each containing the instructions, to one set of traffic simulator devices, which in turn, transmits a portion of the group of messages to other traffic simulator devices in a daisy chain or a mesh-like distribution of instructions so that the server 202 does not need to send a message directly to each traffic simulator devices. In additional embodiments, the instructions can be sent in a broadcast message such that a first portion of the group of traffic simulator devices identified in the broadcast message listen and follow the instructions while a remainder of the traffic simulator devices listen and ignore the instructions. In further embodiments, the sever 202 can multicast or unicast the instructions to a portion of the group of traffic simulator devices.

Figure 2D:
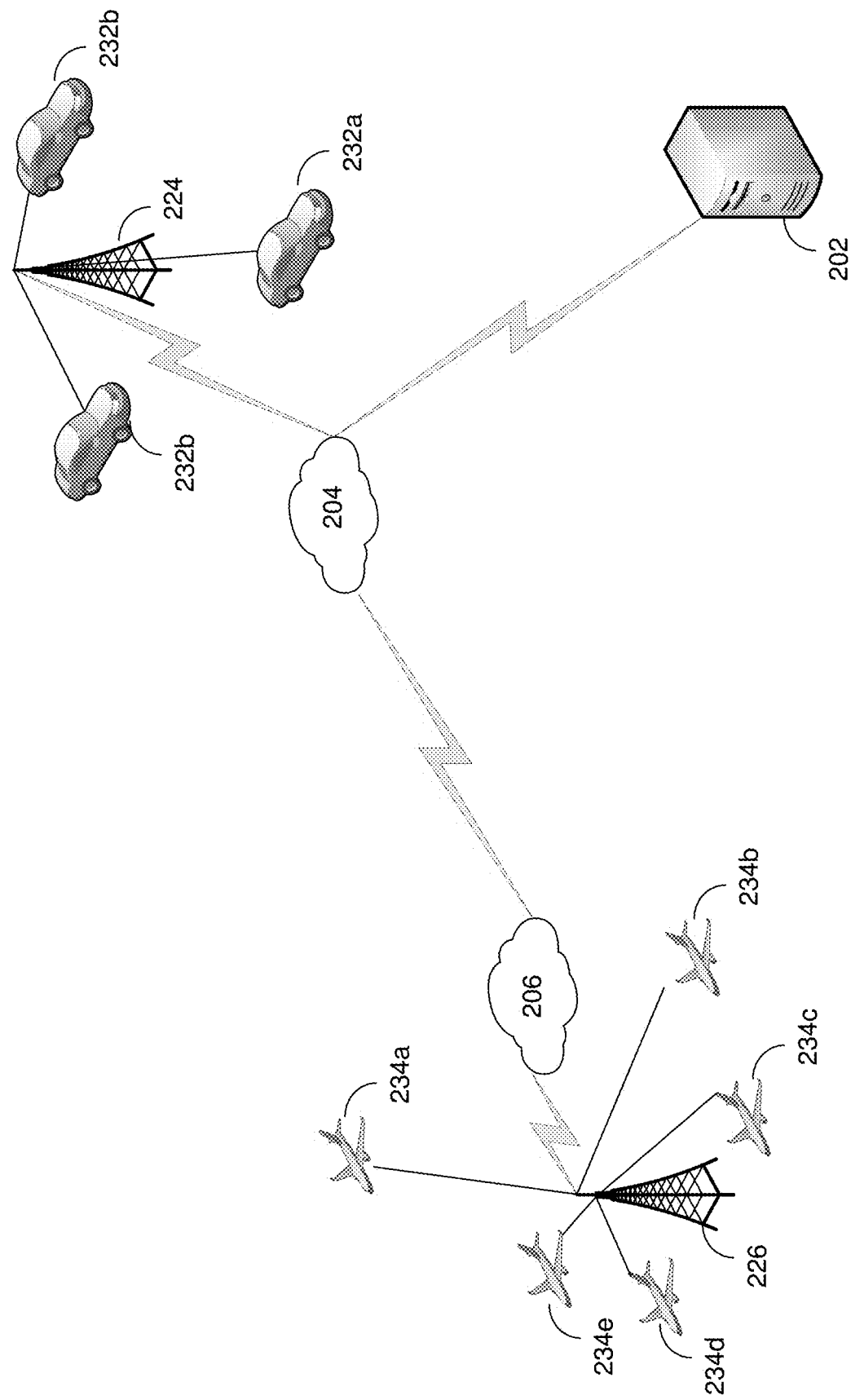

Referring to FIG. 2D, in one or more embodiments, the server 202 can receive a notification from a law enforcement administration computer system. The notification indicates that an imminent law enforcement activity is commencing soon in a portion 204 of the mobile network 230 and to select a group of traffic simulator devices 234a, 234b, 234c, 234d, 234e then provide instructions to the group of traffic simulator devices 234a, 234b, 234c, 234d, 234e in another portion 206 of the mobile network 230 generate simulated voice traffic and/or simulator data traffic as diversion, based on the actual voice traffic and actual data traffic in portion 204 of the mobile network 230 associated with the imminent law enforcement. That is, eavesdroppers/criminals monitoring the mobile network 230 can detect a surge of traffic on the mobile network 230. If the eavesdroppers/criminals detect a surge in a portion 206 of the mobile network 230 but are conducting criminal activity in the portion 204 of the mobile network, then they may continue to conduct their criminal activity. Further, the imminent law enforcement action can be in the portion 204 of the mobile network 230 such that law enforcement vehicles 232a, 232b, 232c generate actual voice traffic and actual data traffic in conducting the imminent law enforcement action but the eavesdroppers/criminal are not alerted because the actual voice traffic and actual data traffic surge is smaller than the simulated voice traffic and simulated data traffic surge. The eavesdropper/criminal would detect surges in both portion of the network if both portions are monitored. That is, the eavesdropper/criminal conducting criminal activity near portion 204 of the mobile network 230 may continue to do so because the eavesdropper/criminal detects higher traffic surges due to simulated voice traffic and simulated data traffic near portion 206 of the mobile network 230 indicating that there may be more law enforcement activity in the vicinity of the portion 206 of mobile network 230. Thus, law enforcement creates a diversion of their actual law enforcement activity with the generated simulated voice traffic and simulated data traffic.

Figure 2E:
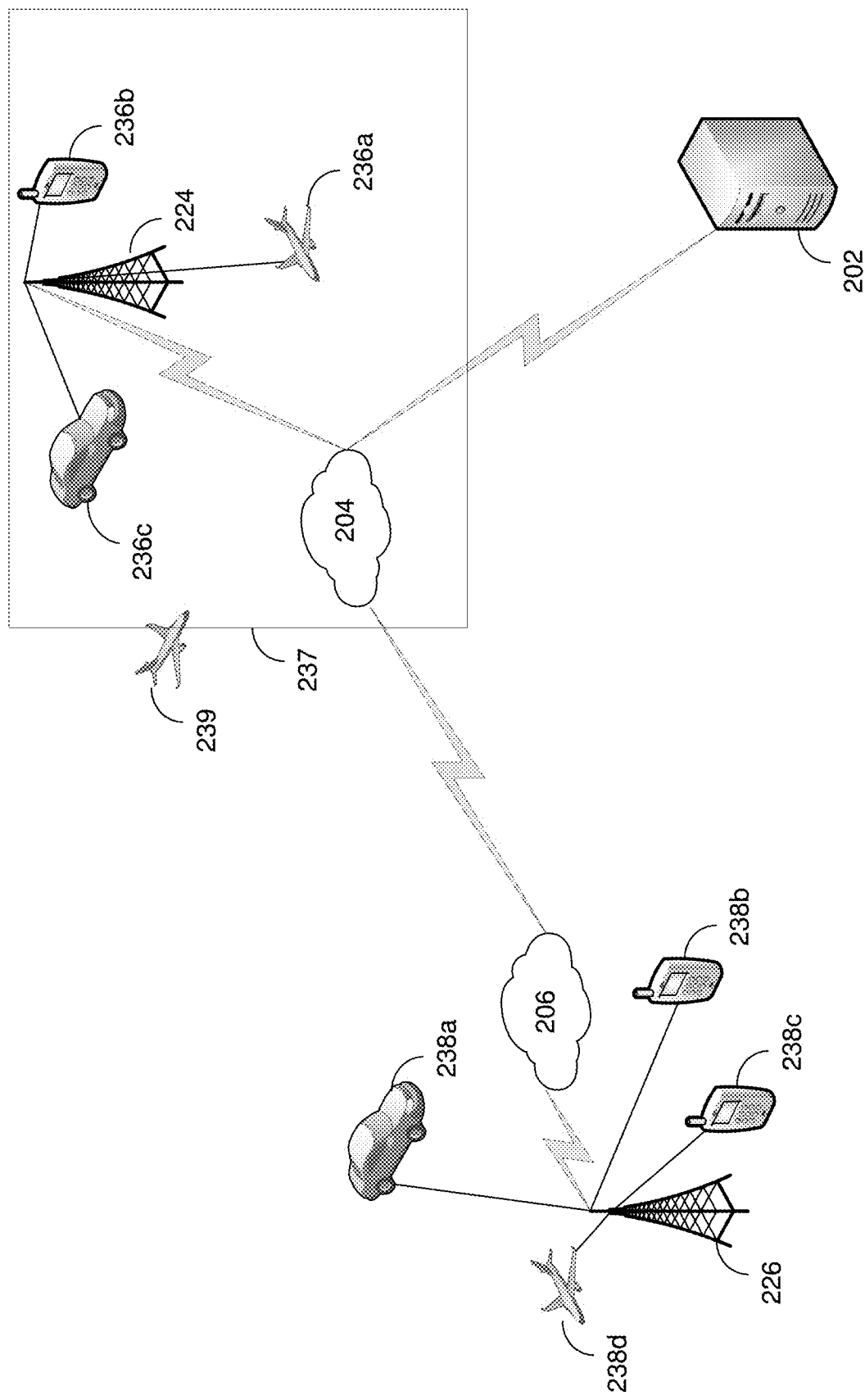

Referring to FIG. 2E, in one or more embodiments, the server 202 can select a geographic area 237 of a mobile network 235 to generate simulated voice traffic and to generate simulated data traffic. The selection of the geographic area 237 can be in response to user-generated input from a law enforcement administration computer system that indicates the geographic region. A geographic region can be a municipality (or portion thereof), county (or portion thereof), or neighborhood, for example. Further, the server 202 can then provide instructions to the traffic simulator devices 236a, 236b, 236c in the geographic region 237 to generate simulated voice traffic and/or simulated data traffic.

In one or more embodiments, the server 202 can detect traffic simulator devices 238a, 238b, 238c, 238d but are outside the selected geographic region 237. Thus, the server 202 does not provide instructions to traffic simulator devices 238a, 238b, 238c, 238d to generate simulated voice traffic and/or simulated data traffic. However, the server 202 can detect a mobile traffic simulator device 239 (e.g., drone, law enforcement vehicle, etc.) entering the selected geographic region 237 and provide instructions to the mobile traffic simulator device 239 to generate either simulated voice traffic or simulated data traffic.

In one or more embodiments, the group of IMSIs provisioned to the group of traffic simulator devices can be temporary IMSIs. Further, the group of IMSIs provisioned to the group of traffic simulator devices can be selected from a pool of IMSIs that are assigned to the geographic region 237 for a time period by the server 202 (a geographic region be a city or state and can comprise a geographic area, which can be a city, or neighborhood). In some embodiments, the group of IMSIs can be selected randomly from the pool of IMSIs. Further, the server 202 can detect the expiration of the time period for the pool of IMSI are assigned to the geographic region and select another group of IMSIs from another pool of IMSI assigned to the geographic region for another time period. Further, the other group of IMSIs can then be provisioned to the group of traffic simulator devices.

Figure 2F:
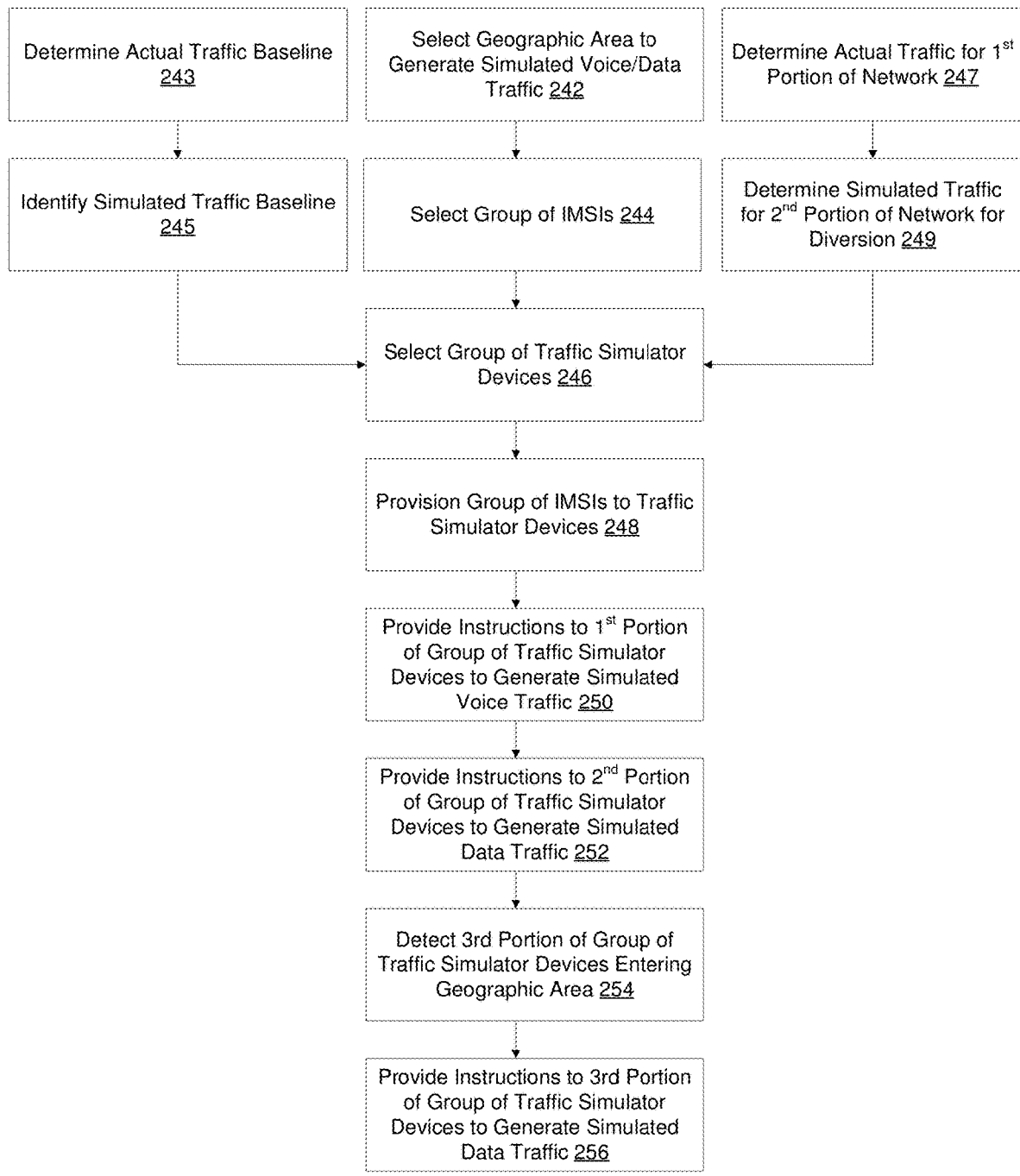
FIGS. 2F-2G depict illustrative embodiments of methods in accordance with various aspects described herein.
Figure 2G:
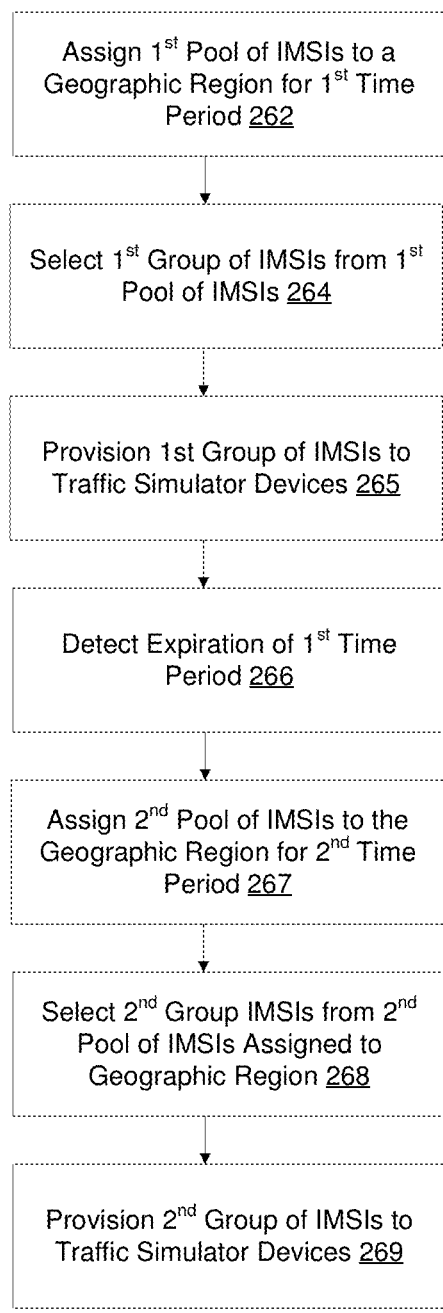

FIGS. 2F-2G depict illustrative embodiments of methods in accordance with various aspects described herein. Methods 240, 260 can be implemented by a server shown and described in FIGS. 2A-2E. Referring to FIG. 2F, in one or more embodiments, the method 240 can include the server, at 242, selecting a geographic area of the mobile network to generate the simulated voice traffic and to generate the simulated data traffic. In some embodiments, the selecting of the geographic area of the mobile network comprises selecting the geographic area of the mobile network to generate the simulated voice traffic and to generate the simulated data traffic in response to receiving user-generated input from an administration computer system indicating the geographic area. Further, the method 240 can include the server, at 244, selecting a first group of IMSIs. In addition, the method 240 can include the server, at 246, selecting a group of traffic simulator devices. Also, the method 240 can include the server, at 248, provisioning, over a mobile network, each of the first group of IMSIs to each of the group of traffic simulator devices. Further, the method 240 can include the server, at 250, providing, over the mobile network, first instructions to a first portion of the group of traffic simulator devices. The first instructions cause the first portion of the group of traffic simulator devices to generate simulated voice traffic over a first plurality of time periods within a 24-hour period (or some other time period). In addition, the method 240 can include the server, at 252, providing, over the mobile network, second instructions to a second portion of the group of traffic simulator devices. The second instructions cause the second portion of the group of traffic simulator devices to generate simulated data traffic over a second plurality of time periods within a 24-hour period (or some other timer period). In some embodiments, the first plurality of time periods and the second plurality of time periods can be the same. In other embodiments, the first plurality of time periods and the second plurality of time periods can overlap. In further embodiments, the first portion of the group of traffic simulator devices and the second group of traffic simulator devices can be the same. In additional embodiments, the first portion of the group of traffic simulator devices and the second group of traffic simulator devices can overlap.

In one or more embodiments, the method 240 can include the server, at 254, detecting, over the mobile network, a third portion of the group of traffic simulator devices has entered the geographic area. Further, the method 240 can include the server, at 256, providing, over the mobile network, third instructions to the third portion of the group of traffic simulator devices. The third instructions cause the third portion of the group of traffic simulator devices to generate simulated data traffic over a third plurality of time periods within a 24-hour period (or some other time period). In some embodiments, the third plurality of time periods can the same as the first plurality of time periods and the second plurality of time periods. In other embodiments, the third plurality of time periods can overlap with the first plurality of time periods and the second plurality of time periods.

In one or more embodiments, the method 240 can include the server, at 243, determining an actual traffic baseline for a portion of the mobile network. Further, the method 240 can include the server, at 245, identifying a simulated traffic baseline for the portion of the mobile network based on the actual traffic baseline. In some embodiments, the selecting of the group of simulator devices comprises selecting the group of traffic simulator devices according to the simulated traffic baseline. In addition, the method 240 can include the server, at 247, determining actual traffic for a first portion of the mobile network. Also, the method 240 can include the server, at 249, determining simulated traffic for a second portion of the mobile network to be used as a diversion based on the actual traffic. In other embodiments, the selecting of the group of traffic simulator devices comprises selecting the group of simulator devices according to the simulated traffic.

In one or more embodiments, the first portion of the group of traffic simulator devices comprises a group of cellular telephones, mobile phones, and/or mobile devices. In further embodiments, the second portion of the group of traffic simulator devices comprises one of a group of stationary traffic simulator devices, a group of mobile traffic simulator devices, a group of first responder vehicles, a group of drones, or a combination thereof. In additional embodiments, the first group of IMSIs comprise temporary IMSIs.

Referring to FIG. 2G, in one or more embodiments, the method 260 can include a server, at 262, assigning a first pool of IMSIs to a geographic region associated with the group of traffic simulator devices for a first time period. Further, the method 260 can include the server, at 264, selecting a first group of IMSIs from the first pool of IMSIs. In some embodiments, the first group of IMSIs are selected randomly from the first pool of IMSIs. The method 260 can include the server, at 265, provisioning, over the mobile network, each of the first group of IMSIs to each of the group of traffic simulator devices. In addition, the method 260 can include the server, at 266, detecting expiration of the first time period. The method 260 can include the server, at 267, assigning a second pool of IMSIs to the geographic region associated with the group of traffic simulator devices for a second time period. Also, the method 260 can include the server, at 268, selecting a second group of IMSIs from the second pool of IMSIs. In some embodiments, the second group of IMSIs are selected randomly from the second pool of IMSIs. Further, the method 260 can include the server, at 269, provisioning, over the mobile network, each of the second group of IMSIs to each of the group of traffic simulator devices.

While for purposes of simplicity of explanation, the respective processes are shown and described as a series of blocks in FIG. 2F and FIG. 2G, it is to be understood and appreciated that the claimed subject matter is not limited by the order of the blocks, as some blocks may occur in different orders and/or concurrently with other blocks from what is depicted and described herein. Moreover, not all blocks that may be required to implement the methods described herein are illustrated. Further, one or more steps of method 240 can be performed in combination with one or more steps in method 240. In addition, a step in the method 240 or method 260 can be in response to another step in method 240 or method 260.

Further, a portion of an embodiment can be combined with another portion of an embodiment.

Referring now to FIG. 3, a block diagram 300 is shown illustrating an example, non-limiting embodiment of a virtualized communication network in accordance with various aspects described herein. In particular a virtualized communication network is presented that can be used to implement some or all of the subsystems and functions of system 100, the subsystems and functions of system 200, 200a, 200b, 230, 235 and methods 240 and 260 presented in FIGS. 1, 2A, 2B, 2C, and 3. For example, virtualized communication network 300 can facilitate in whole or in part selecting a group of traffic simulator devices and providing instructions to portions of the group of traffic simulator devices to generate simulated voice traffic and/or simulated data traffic.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general purpose processors or general purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it's elastic: so the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized, and might require special DSP code and analog front-ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements don't typically need to forward large amounts of traffic, their workload can be distributed across a number of servers—each of which adds a portion of the capability, and overall which creates an elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud, or might simply orchestrate workloads supported entirely in NFV infrastructure from these third party locations.

Figure 4:
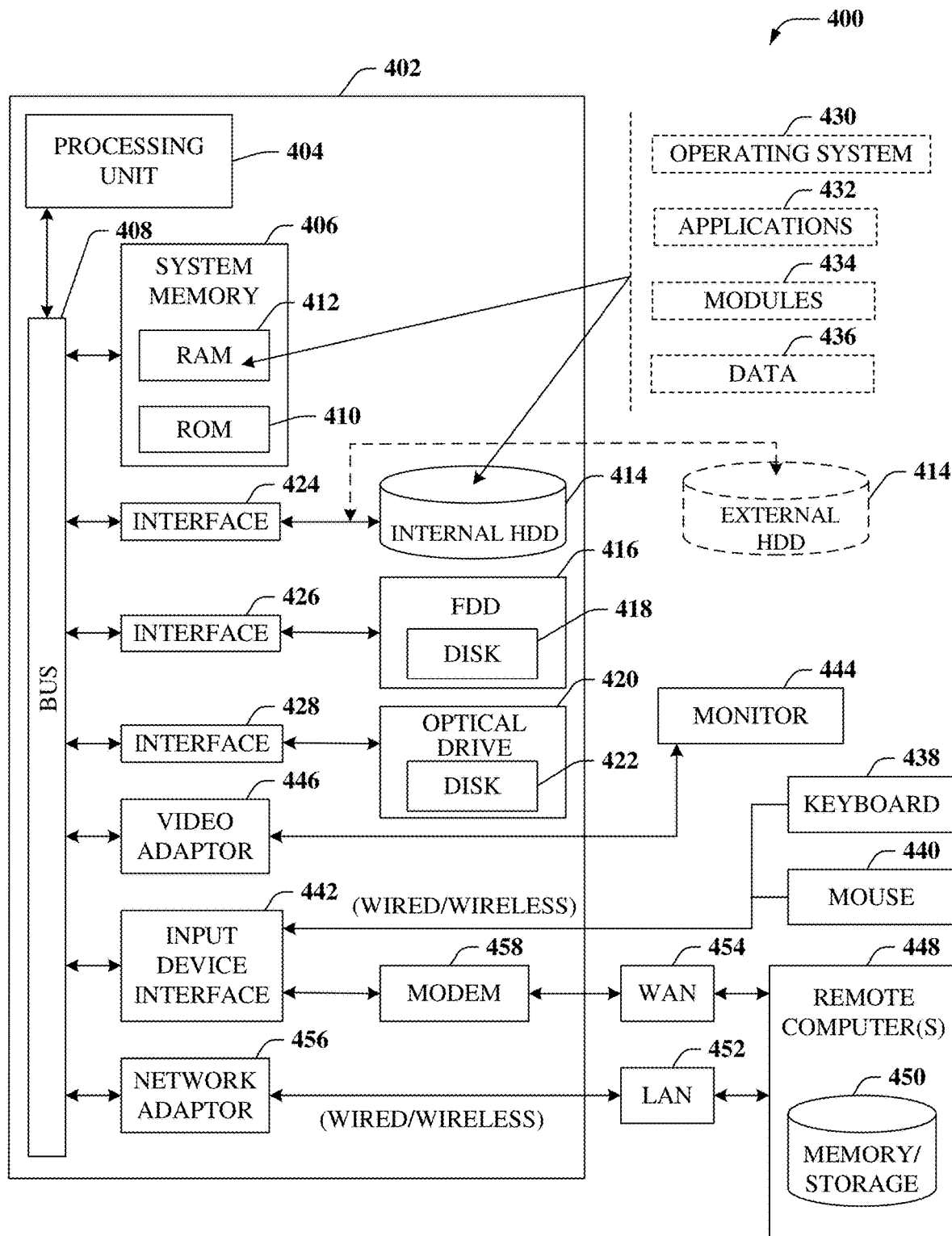
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part selecting a group of traffic simulator devices and providing instructions to portions of the group of traffic simulator devices to generate simulated voice traffic and/or simulated data traffic. Further, computing devices shown in FIGS. 2A-2E, including, but not limited to, server 202, mobile devices 208, 210, 212, 214, law enforcement vehicles 216, 218, drones 210a, 214b, mobile device 212a, 214a, law enforcement vehicles 216a, 218a, 232a, 232b, 232c, drones 234a, 234b, 234c, 234d, 234e, 236a, mobile device 236b, law enforcement vehicle 236c, 238a, mobile device 238b, 238c, drone 238d, 239 can comprise computing environment 400.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
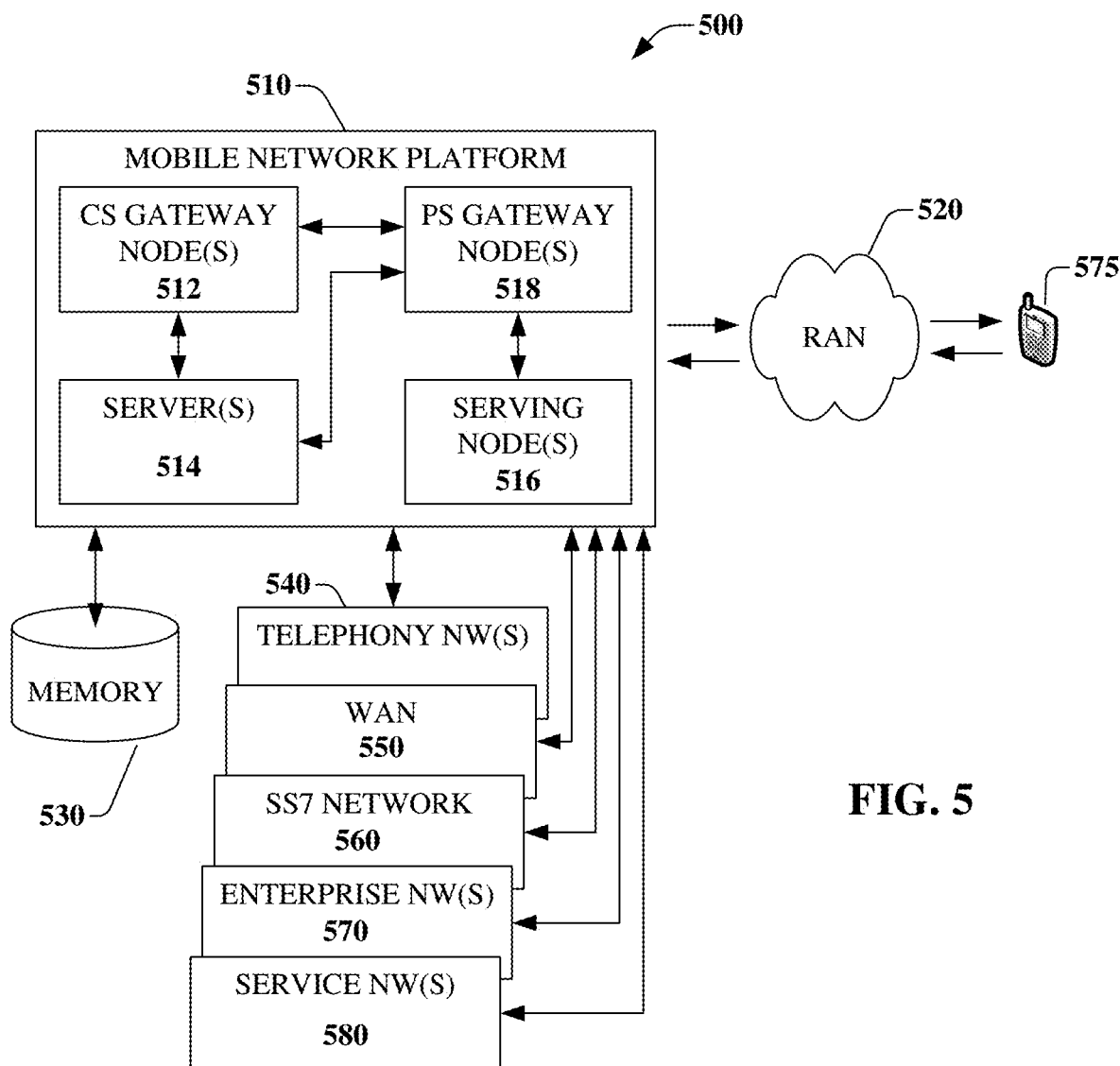
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in selecting a group of traffic simulator devices and providing instructions to portions of the group of traffic simulator devices to generate simulated voice traffic and/or simulated data traffic. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks, and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology(ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processor can execute code instructions stored in memory 530, for example. It is should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
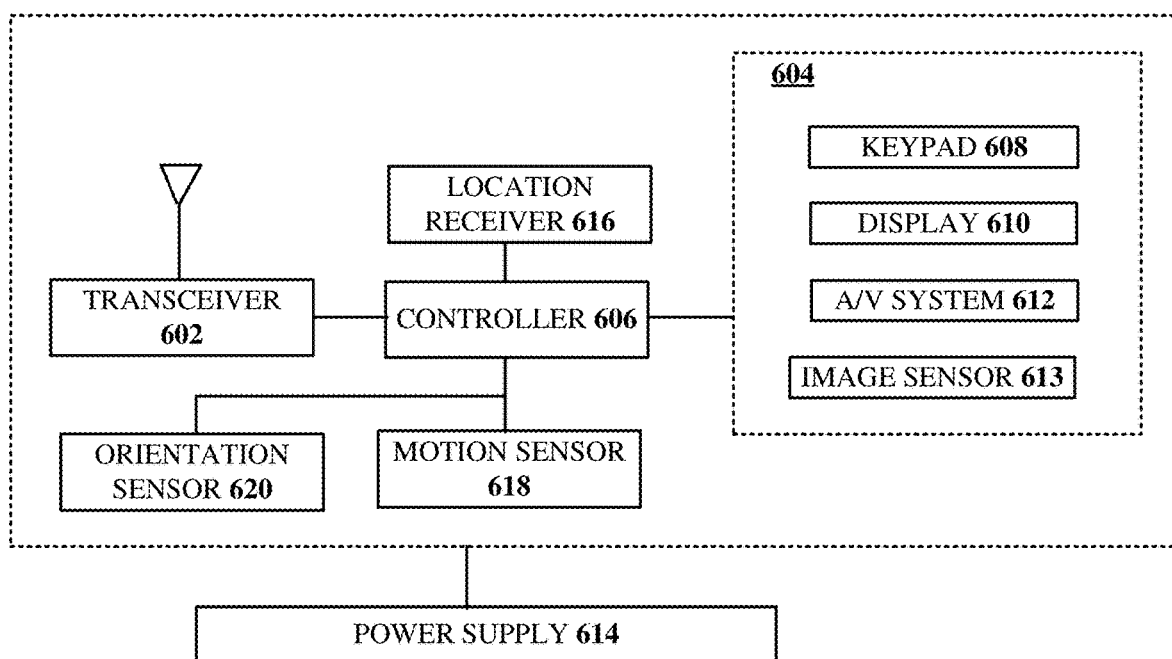
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part selecting a group of traffic simulator devices and providing instructions to portions of the group of traffic simulator devices to generate simulated voice traffic and/or simulated data traffic. Further, computing devices shown in FIGS. 2A-2E, including, but not limited to, server 202, mobile devices 208, 210, 212, 214, law enforcement vehicles 216, 218, drones 210*a*, 214*b*, mobile device 212*a*, 214*a*, law enforcement vehicles 216*a*, 218*a*, 232*a*, 232*b*, 232*c*, drones 234*a*, 234*b*, 234*c*, 234*d*, 234*e*, 236*a*, mobile device 236*b*, law enforcement vehicle 236*c*, 238*a*, mobile device 238*b*, 238*c*, drone 238*d*, 239 can comprise communication device 600.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, x=(x1, x2, x3, x4, . . . , xn), to a confidence that the input belongs to a class, that is, f(x)= confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:
a processing system including a processor; and
a memory that stores executable instructions that, when executed by the processing system, facilitate performance of operations, the operations comprising:
selecting a first group of International Mobile Subscriber Identities (IMSIs);
selecting a group of traffic simulator devices;
provisioning, over a mobile network, each of the first group of IMSIs to each of the group of traffic simulator devices;
providing, over the mobile network, first instructions to a first portion of the group of traffic simulator devices, wherein the first instructions cause the first portion of the group of traffic simulator devices to generate simulated voice traffic over a first plurality of time periods; and
providing, over the mobile network, second instructions to a second portion of the group of traffic simulator devices, wherein the second instructions cause the second portion of the group of traffic simulator devices to generate simulated data traffic over a second plurality of time periods.

2. The device of claim 1, wherein the operations further comprise selecting a geographic area of the mobile network to generate the simulated voice traffic and to generate the simulated data traffic.

3. The device of claim 2, wherein the selecting of the geographic area of the mobile network comprises selecting the geographic area of the mobile network to generate the simulated voice traffic and to generate the simulated data traffic in response to receiving user-generated input instruction indicating the geographic area.

4. The device of claim 2, wherein the operations comprise:
  detecting, over the mobile network, a third portion of the group of traffic simulator devices has entered the geographic area; and
  providing, over the mobile network, third instructions to the third portion of the group of traffic simulator devices, wherein the third instructions cause the third portion of the group of traffic simulator devices to generate simulated data traffic over a third plurality of time periods.

5. The device of claim 1, wherein the first portion of the group of traffic simulator devices comprises a group of mobile phones.

6. The device of claim 1, wherein the second portion of the group of traffic simulator devices comprises one of a group of stationary traffic simulator devices, a group of mobile traffic simulator devices, a group of first responder vehicles, a group of drones, or a combination thereof.

7. The device of claim 1, wherein the operations comprise:
  assigning a first pool of IMSIs to a geographic region associated with the group of traffic simulator devices for a first time period.

8. The device of claim 7, wherein the selecting of the first group of IMSIs comprises selecting the first group of IMSIs from the first pool of IMSIs.

9. The device of claim 8, wherein the operations comprise:
  detecting expiration of the first time period;
  assigning a second pool of IMSIs to the geographic region associated with the group of traffic simulator devices for a second time period;
  selecting a second group of IMSIs from the second pool of IMSIs; and
  provisioning, over the mobile network, each of the second group of IMSIs to each of the group of traffic simulator devices.

10. The device of claim 1, wherein the operations comprise:
  determining an actual traffic baseline for a portion of the mobile network; and
  identifying a simulated traffic baseline for the portion of the mobile network based on the actual traffic baseline, wherein the selecting of the group of traffic simulator devices comprises selecting the group of traffic simulator devices according to the simulated traffic baseline.

11. The device of claim 1, wherein the operations comprise:
  determining actual traffic for a first portion of the mobile network; and
  determining simulated traffic for a second portion of the mobile network to be used as a diversion based on the actual traffic, wherein the selecting of the group of traffic simulator devices comprises selecting the group of traffic simulator devices according to the simulated traffic.

12. A non-transitory machine-readable medium, comprising executable instructions that, when executed by a processing system including a processor, facilitate performance of operations, the operations comprising:
  selecting a first group of International Mobile Subscriber Identities (IMSIs);
  determining an actual traffic baseline for a portion of a mobile network;
  identifying a simulated traffic baseline for the portion of the mobile network based on the actual traffic baseline;
  selecting a group of traffic simulator devices according to the simulated traffic baseline;
  provisioning, over the mobile network, each of the first group of IMSIs to each of the group of traffic simulator devices;
  providing, over the mobile network, first instructions to a first portion of the group of traffic simulator devices, wherein the first instructions cause the first portion of the group of traffic simulator devices to generate simulated voice traffic over a first plurality of time periods; and
  providing, over the mobile network, second instructions to a second portion of the group of traffic simulator devices, wherein the second instructions cause the second portion of the group of traffic simulator devices to generate simulated data traffic over a second plurality of time periods.

13. The non-transitory machine-readable medium of claim 12, wherein the operations further comprise selecting a geographic area of the mobile network to generate the simulated voice traffic and to generate the simulated data traffic.

14. The non-transitory machine-readable medium of claim 13, wherein the selecting of the geographic area of the mobile network comprises selecting the geographic area of the mobile network to generate the simulated voice traffic and to generate the simulated data traffic in response to receiving user-generated input indicating the geographic area.

15. The non-transitory machine-readable medium of claim 13, wherein the operations comprise:
  detecting, over the mobile network, a third portion of the group of traffic simulator devices has entered the geographic area; and
  providing, over the mobile network, third instruction to the third portion of the group of traffic simulator devices, wherein the third instructions cause the third portion of the group of traffic simulator devices to generate simulated data traffic over a third plurality of time periods.

16. The non-transitory machine-readable medium of claim 12, wherein the operations comprise:
  assigning a first pool of IMSIs to a geographic region associated with the group of traffic simulator devices for a first time period, wherein the selecting of the first group of IMSIs comprises selecting the first group of IMSIS from the first pool of IMSIs.

17. The non-transitory machine-readable medium of claim 16, wherein the operations comprise:
  detecting expiration of the first time period;
  assigning a second pool of IMSIs to the geographic region associated with the group of traffic simulator devices for a second time period;
  selecting a second group of IMSIs from the second pool of IMSIs; and provisioning, over the mobile network, each of the second group of IMSIs to each of the group of traffic simulator devices.

18. A method, comprising:

selecting, by a processing system including a processor a group of International Mobile Subscriber Identities (IMSIs);

determining, by the processing system, actual traffic for a first portion of a mobile network;

determining, by the processing system, simulated traffic for a second portion of the mobile network to be used as a diversion based on the actual traffic;

selecting, by the processing system, a group of traffic simulator devices according to the simulated traffic;

provisioning, by the processing system, over the mobile network, each of the group of IMSIs to each of the group of traffic simulator devices;

providing, by the processing system, over the mobile network, first instructions to a first portion of the group of traffic simulator devices, wherein the first instructions cause the first portion of the group of traffic simulator devices to generate simulated voice traffic over a first plurality of time periods; and providing, by the processing system, over the mobile network, second instructions to a second portion of the group of traffic simulator devices, wherein the second instructions cause the second portion of the group of traffic simulator devices to generate simulated data traffic over a second plurality of time periods.

19. The method of claim 18, comprising selecting, by the processing system, a geographic area of the mobile network to generate the simulated voice traffic and to generate the simulated data traffic.

20. The method of claim 19, wherein the selecting of the geographic area of the mobile network comprises selecting, by the processing system, the geographic area of the mobile network to generate the simulated voice traffic and to generate the simulated data traffic in response to receiving, by the processing system, user-generated input indicating the geographic area.

* * * * *